Sept. 1, 1953
J. MARCO
2,650,792
MIXING VALVE
Filed May 3, 1949
4 Sheets-Sheet 1
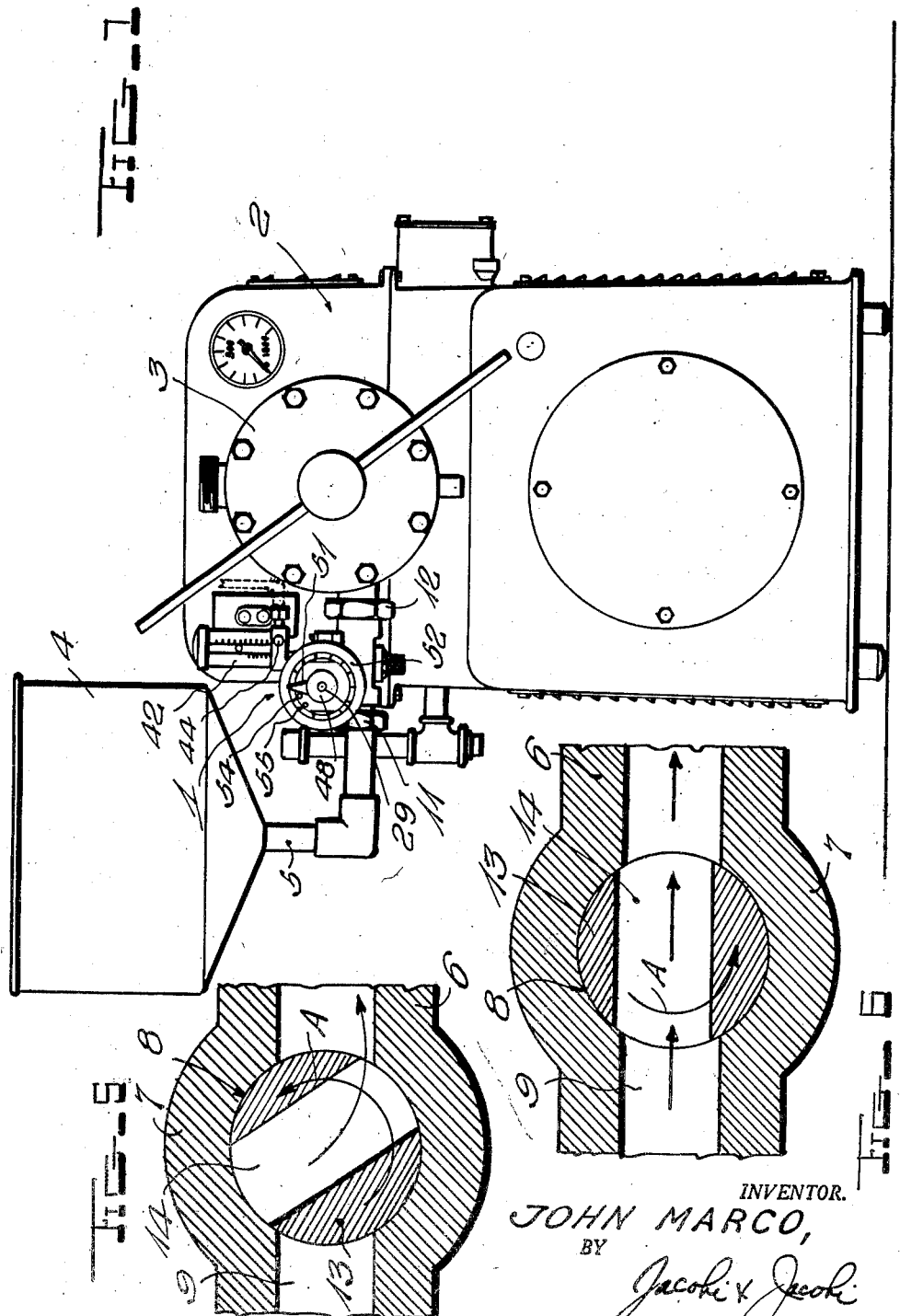
INVENTOR.
JOHN MARCO,
BY
Jacobi x Jacobi
ATTORNEYS Sept. 1, 1953  J. MARCO  2,650,792
MIXING VALVE
Filed May 3, 1949  4 Sheets-Sheet 2
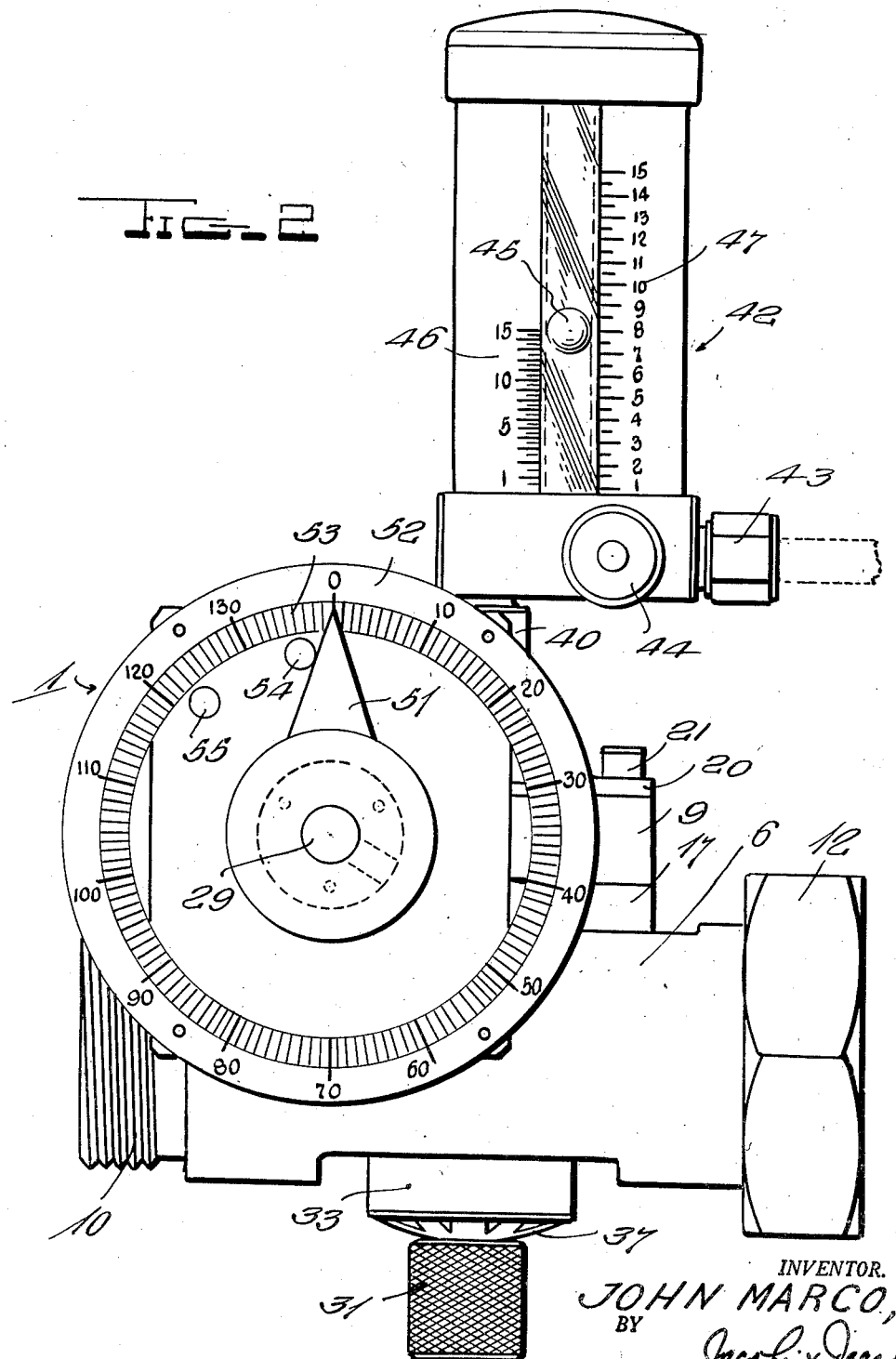
INVENTOR.
JOHN MARCO,
BY
Jacobi & Jacobi
ATTORNEYS

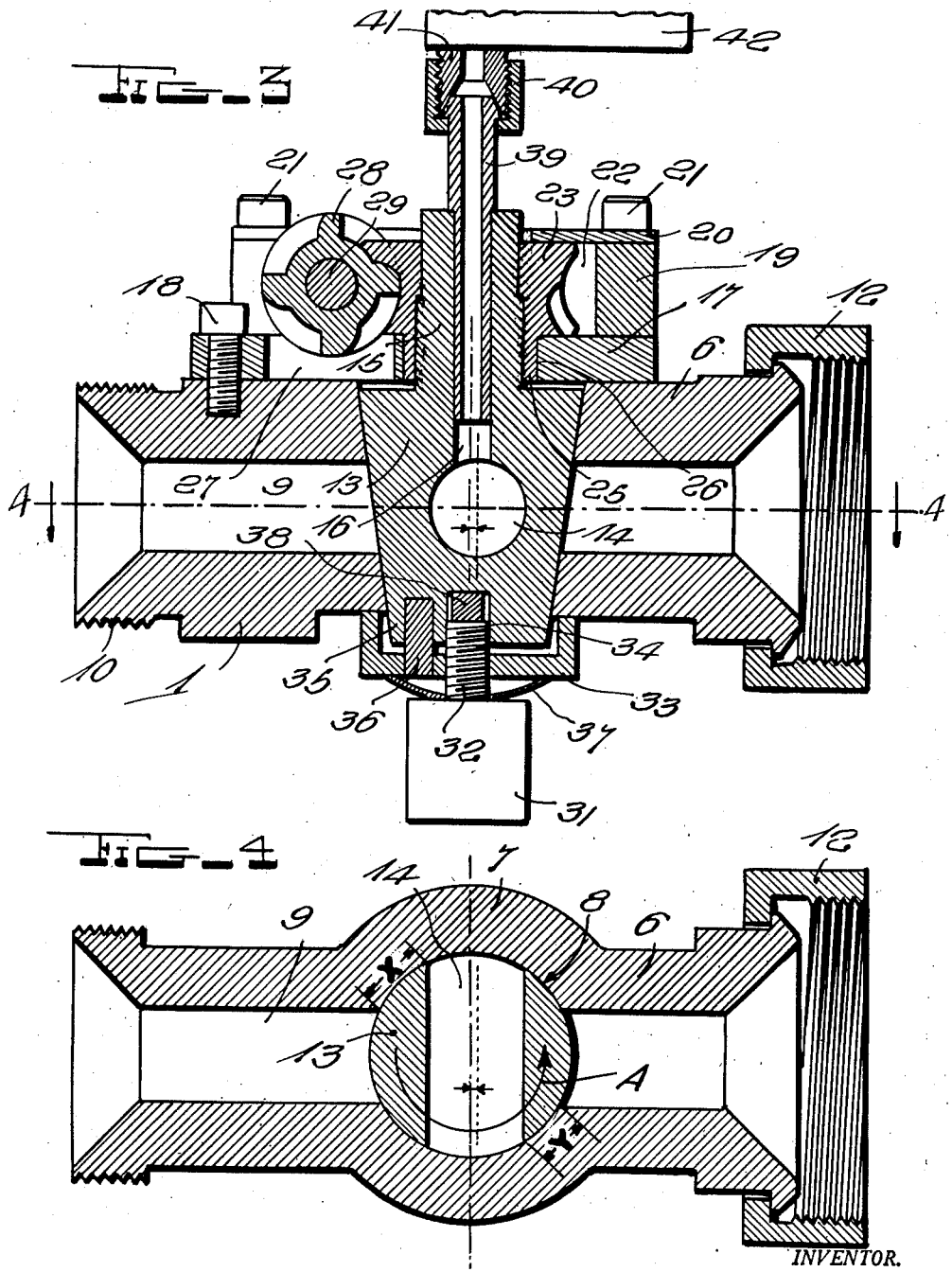

Sept. 1, 1953  J. MARCO  2,650,792
MIXING VALVE
Filed May 3, 1949  4 Sheets-Sheet 4
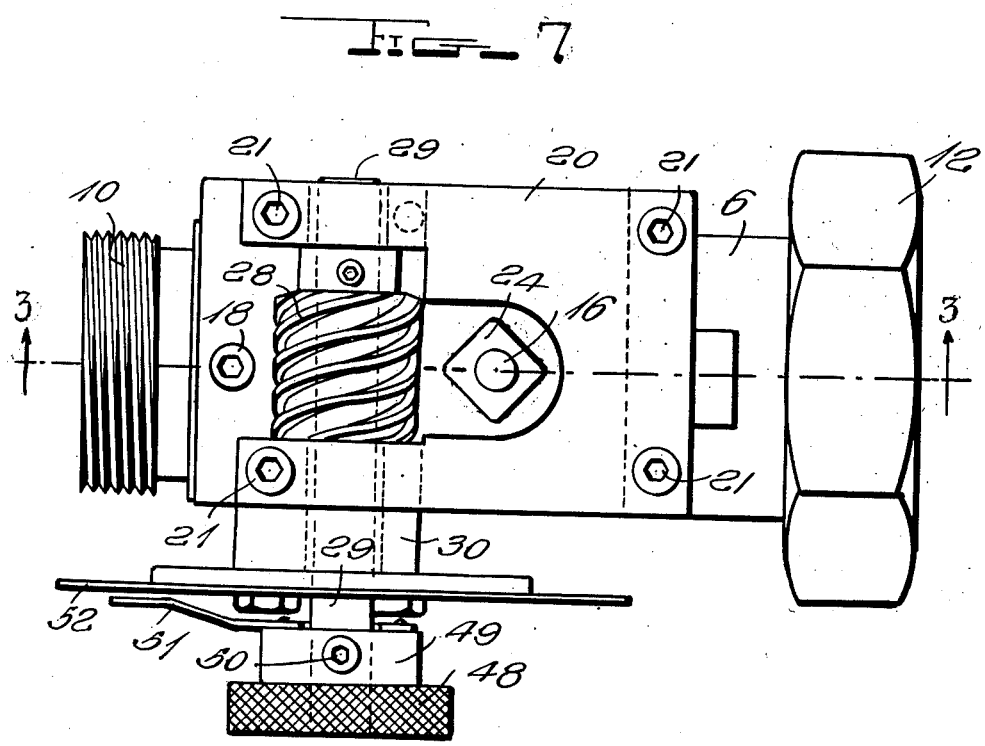
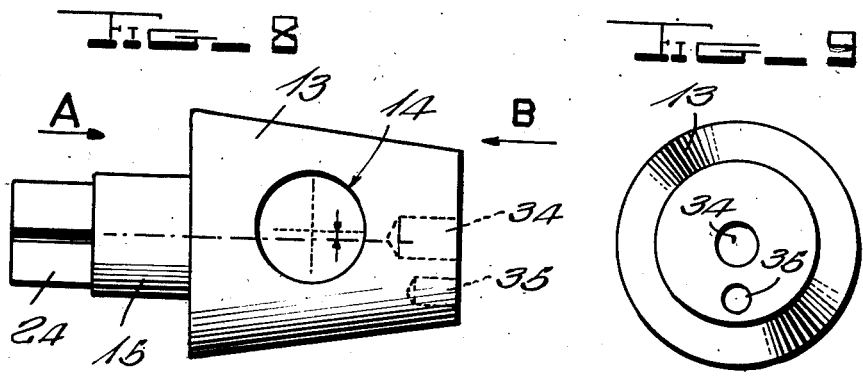
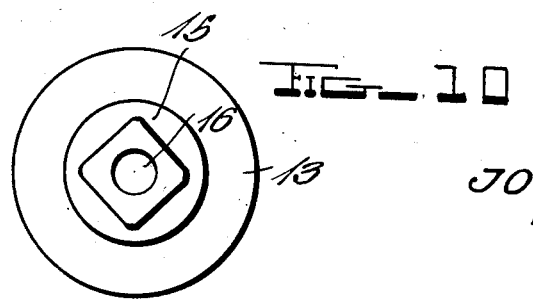
INVENTOR.
JOHN MARCO,
BY
Jacobi & Jacobi
ATTORNEYS Patented Sept. 1, 1953

2,650,792

UNITED STATES PATENT OFFICE 2,650,792

MIXING VALVE

John Marco, Wilmington, Del.

Application May 3, 1949, Serial No. 91,203

1 Claim. (Cl. 251—95)

This invention relates to a mixing valve and more particularly to a valve employed for controlling flow of a liquid or semi-solid material in conjunction with the flow of gas or air which is to be mixed with the material being treated.

It is one object of the invention to provide a valve of such construction that the material to be treated and the air or gas to be mixed therewith may be passed through the valve in such relation to each other that the air or gas will be thoroughly mixed with the material to be treated and thus provide a treated material which is light and fluffy when delivered from the valve.

Another object of the invention is to so form the valve that the air or gas is delivered downwardly into the bore of a valve plug through which the material to be treated moves, the valve plug being of such formation that when it is moved in an opening direction air or gas will first be permitted to flow through the bore of the valve plug and the material to be treated then admitted. By this arrangement, the flow of air through the bore of the valve plug can first be regulated and the material then admitted in such proportional relation to the incoming air or gas that a predetermined mixture will be obtained.

Another object of the invention is to provide improved means for imparting opening and closing movement to the valve plug, the said adjusting means for the valve plug having a dial associated with it, by means of which the extent to which the valve plug has been moved in an opening direction may be determined and thus allow a machine to be adjusted at a future date and an identical mixture of material and air or gas obtained.

Another object of the invention is to provide the valve plug with improved means for drawing the same to a seated position in the body portion of the valve and thus eliminate any possibility of material being treated from leaking about the valve plug instead of passing through the bore of the plug.

Another object of the invention is to provide a mixing valve with which an air-flow meter may be associated and serve as means for recording flow of air or gas into the bore of the valve plug. This air-flow meter is of conventional construction and includes in its construction a scale for indicating the flow of air through the same, and it is thus possible to accurately determine the flow of air or gas as well as the flow of material being treated so that after a certain material has been treated and an additional quantity of the same material is to be produced, this can accurately be done and a duplicate of the first material produced.

Another object of the invention is to provide a mixing valve of the improved construction which consists of elements firmly held together when assembled but capable of being very easily taken apart so that the valve may be thoroughly cleaned and thus kept sanitary.

The invention is illustrated in the accompanying drawings wherein:

Fig. 1 is a side elevation of a homogenizing machine equipped with a mixing valve of the improved construction.

Fig. 2 is a view upon an enlarged scale showing the improved mixing valve in elevation.

Fig. 3 is a vertical sectional view taken longitudinally through the improved mixing valve along the line 3—3 of Fig. 7.

Fig. 4 is a longitudinal sectional view taken horizontally through the mixing valve along the line 4—4 of Fig. 3.

Fig. 5 is a fragmentary sectional view showing the plug of the mixing valve turned to a position allowing flow of air or gas through it but preventing the flow of the material to be treated through the valve.

Fig. 6 is a view similar to Fig. 5 showing the valve plug turned to a fully opened position.

Fig. 7 is a top plan view of the mixing valve.

Fig. 8 is a view in elevation of the plug for the mixing valve.

Fig. 9 is a view looking at the end of the plug indicated by the letter B in Fig. 8.

Fig. 10 is a view looking at the end of the valve plug indicated by the letter A in Fig. 8.

The improved mixing valve which is indicated in general by the numeral 1 has been shown in connection with the homogenizing machine 2, but it will be understood that its use is not restricted to such a machine. This homogenizing machine includes in its construction a pump 3 as one of its elements and during operation of the homogenizing machine, the material to be treated is drawn from a hopper 4 through a pipeline 5 to the valve 1 where air or gas is mixed with the material as the air or gas and the material to be treated are drawn through the valve by action of the pump.

While a hopper has been shown for holding the material to be treated, it will be understood that the material may be delivered from any suitable source of supply to the valve and that air or gas is obtained from any suitable source of supply.

This improved valve has a body 6 formed of strong cast metal or other suitable material. Intermediate its length the housing is enlarged transversely, as shown at 7, and formed with a socket 8 which tapers from its upper end to its lower end, as shown at Fig. 3. Then, upon referring to this figure, it will be seen that the socket intersects the passage 9 formed longitudinally through the body. One end of the body is externally threaded, as shown at 10, for engagement by a nut 11, by means of which this end of the body is connected with the supply pipe 5 and the other end of the body carries a nut or union 12 by means of which the outlet end of the valve is connected with the pump 3.

A downwardly tapered valve plug 13 is mounted vertically in the socket 8 and is formed with a transversely extending bore 14 which is somewhat offset diametrically of the plug, as shown clearly in Figs. 4, 5, and 6. Since the bore 14 extends diametrically of the plug, it may be moved by rotation of the valve plug from the fully closed position shown in Fig. 4 towards the fully opened position shown in Fig. 6. The fact that the bore 14 is offset diametrically of the plug causes the portion of the plug at one side of the bore to be thicker than the portion of the plug at the other side of the bore. Therefore, when the plug is in the closed position shown in Fig. 4, the distance X between the inlet end portion of the bore 9 of the body and one end of the bore 14 is greater than the distance Y between the other end of the bore 14 and the outlet end portion of the bore 9. It will thus be seen that when the plug is turned towards the opened position in the counter-clockwise direction indicated by the arrow A, the outlet end of the bore 14 will move into position for communicating with the outlet end of the bore 9 before the inlet end of the bore 14 is in registry with the inlet end of the bore 9. This is clearly shown in Fig. 5 and by comparing this figure with Fig. 6, it will be seen that further turning of the valve plug in the opening direction will gradually cause both ends of the bore 14 to communicate with the inlet and outlet ends of the bore 9 of the valve body and eventually the valve plug will be moved to the fully opened position shown in Fig. 6.

A plate 17 is secured upon the upper portion of the body 6 by a single screw 18 and upon this plate rests a spacer 19 of U-shaped formation. There is also provided a cover plate 20 which rests flat upon the spacer and is also substantially U-shaped, the spacer and the cover plate being secured to the plate 17 by screws 21. Since the spacer 19 is of U-shaped formation, it defines a pocket 22 to receive a worm-gear 23 which fits about the neck or shank 15 of the valve plug and since the upper portion 24 of the neck 15 is rectangular in cross-section and passes through a similarly shaped portion of the center opening of the worm-gear, rotation of the worm-gear will cause the valve plug to turn with it towards an opened or closed position. The depending neck 25 of the worm-gear is circular in cross-section and fits snugly in an opening 26 formed in the plate 17 so that the worm-gear will be held centered with respect to the valve plug and its neck or shank.

A second opening 27 is formed in the plate 17 to accommodate the end portion of a worm-screw 28 which meshes with the worm-gear and is carried by a shaft 29. This shaft 29 is rotatably mounted through arms of the U-shaped spacer 19 and also rotatably mounted through the bearing block 30 projecting from the side of the spacer.

In order to hold the valve plug firmly seated in the downwardly tapered pocket 8, there has been provided a securing screw 31 having a threaded shank 32 which passes through a flanged washer 33 and is screwed into a threaded socket 34 formed centrally of the lower end of the valve plug. The valve plug is also formed with a socket 35 offset with respect to the threaded socket 34 and into the socket 35 fits a pin 36 which is carried by the flanged washer 33 and prevents the washer and the valve plug from having turning movement relative to each other.

A spring 37 formed from a disc of resilient metal fits about the stem of the screw 31 with its marginal edge portion bearing against the outer face of the washer 33, and when the screw is turned in a tightening direction, the valve plug will be drawn downwardly until it has tight-fitting engagement with walls of the socket 8. By placing a small metal block 38 in the socket 34, the extent to which the screw 31 may be tightened will be controlled and possibility of overtightening of the valve plug will be eliminated.

A tube or nipple 39 fits snugly in the bore or passage 16 formed through the neck of the valve plug and this nipple projects upwardly from the valve plug and carries a gland 40 by means of which the nipple is detachably connected with the outlet neck 41 of an air-flow meter 42. This air-flow meter is of conventional construction and air or gas which enters the same through the inlet 43 will flow through the meter when the needle valve 44 is opened. The gage ball 45 indicates the amount of air or gas flowing through the meter when the valve is opened, and by observing the relation of the ball to the scale markings 46 and 47 on the meter, an operator can determine the amount of air or gas allowed to flow through the tube 39 and into the bore 14 of the valve plug during operation of the machine.

During operation of the machine the amount of material to be treated must be controlled in relation to the air or gas to be mixed with it. This is accomplished by adjustment of the valve plug. This plug must be turned to an opened or closed position, and turning of the valve is accomplished by rotation of the worm 28. The shaft 29 which carries this worm projects outwardly from the bearing block 30 and at its outer end carries a turning knob 48. This knob is formed with a neck 49 carrying a set screw 50 by means of which the knob is firmly secured to the shaft and against the end of the neck 49 is secured a pointer 51 which extends radially from the knob and also radially of a dial 52 having central markings 53 thereon arranged in a circular path concentric with the dial and its marginal edge.

Abutment pins 54 and 55 project forwardly or outwardly from the dial 52 and when the pointer 51 is in engagement with the pin 54, the valve will be fully closed. By turning the knob 50 in a clockwise direction the pointer will gradually move along the circular line of central markings until it has engagement with the abutment pin 55, at which time turning of the shaft 29 is stopped and the valve plug will be in the fully opened position.

During operation of the machine, the hopper 4 is filled with the material to be treated or this material may be delivered to the inlet end of the valve through any suitable source. The needle valve 44 is opened to allow flow of air through the valve and the shaft 29 is turned to effect rotation of the valve plug in an opening direction. When the valve is moved to the opening position, air or gas is first allowed to flow through the bore 14 and into the outlet portion of the bore 9 of the valve body 6 and continued rotation of the valve plug in the opening direction will then move the valve plug to such a position that its bore 14 registers with the inlet end of the bore 9 as well as the outlet end thereof. The material to be treated is then sucked through the bore 14 by action of the pump 3, and as this material moves through the bore 14, the air or gas will mix with the material. By properly adjusting the needle valve 44 of the air-flow meter and the valve plug, the correct proportion of material and the air or gas to be mixed therewith can be regulated. When the treated material is of the desired consistency, the operator will note the positions of the gage ball 45 and the pointer 57 and make a record of same.

It will thus be seen that when at a future time it is desired to produce another batch of treated material of the same consistency, it is merely necessary to adjust the needle valve 49 and the valve plug until the gage ball and pointer 51 are at the recorded positions occupied when producing the initial batch, and a duplicate batch can be made. After the batch has been finished, the valve can be very easily taken apart and thoroughly cleaned before the machine is again used.

By connecting the mixing valve with the pump 3 at the inlet side of the homogenizing machine, it is possible to pull into the pump solids and gases in metered percentages, where it is desired to have a homogeneous gas impregnated into solids to either function as an aerating or foaming solid or semi-liquid bases, such as syrups to be converted into marshmallow, latex to be converted into foam rubber, and the like.

From the foregoing description of the construction of my improved device, the operation thereof and the method of assembly will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what I claim is:

A valve for a mixing apparatus comprising a body formed with a longitudinally extending bore axially disposed throughout its length, the body being also formed intermediate its length with a transverse socket tapered toward one end for its full length and intersecting the bore diametrically thereof and dividing the bore into end portions spaced from each other by the said socket, a plug conforming to the taper of said bore for its entire length fitted into the bore through the large end thereof and having rotatable wedging fit within the bore for movement to opened and closed positions, said plug being formed intermediate its length with a transverse bore of a diameter corresponding to that of the bore of the body, the bore of the plug being offset transversely of the center of the plug for its full length, whereby the bore of the plug is disposed in transversely offset relation to the spaced portions of the bore of the body when said plug is in its opened position and whereby turning movement of the plug in an opening direction will first move one end of its diametrically offset bore into communication with one end portion of the bore of the body before its other end moves into communication with the other end portion of the bore of the body, and both ends of the core of the plug, then communicate with the bore of the body, and a stem projecting from the large end of the plug axially thereof and outwardly from the body and formed with a longitudinally extending axially disposed bore having its inner end communicating with the bore of the plug midway of the length thereof and in diametrically offset relation thereto.

JOHN MARCO.

References Cited in the file of this patent

UNITED STATES PATENTS

| Number | Name | Date |
|---|---|---|
| 795,357 | Maxwell | July 25, 1905 |
| 1,007,729 | Poppe | Nov. 7, 1911 |
| 1,148,409 | Roessler | July 27, 1915 |
| 1,737,496 | Feroldi | Nov. 26, 1929 |
| 2,012,020 | Perrier | Aug. 20, 1935 |
| 2,197,954 | Turpin | Apr. 23, 1940 |
| 2,258,023 | McKernon | Oct. 7, 1941 |

FOREIGN PATENTS

| Number | Country | Date |
|---|---|---|
| 1,009 | Great Britain | of 1889 |
| 192,329 | Great Britain | of 1923 |
| 518,583 | Great Britain | of 1940 |
| 609,694 | France | of 1926 |
| 721,059 | France | of 1932 |